（12）United States Patent
Cruz et al.

(10) Patent No.: US 12,208,967 B2
(45) Date of Patent: Jan. 28, 2025

(54) MAGNETIC COVER APPARATUSES, SYSTEMS, AND METHODS

(71) Applicant: INTELLIGRATED HEADQUARTERS, LLC, Mason, OH (US)

(72) Inventors: Shanty Rosas Cruz, Mexico City (MX); Sarahi Romero Castillo, Mexico City (MX)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 76 days.

(21) Appl. No.: 18/159,765

(22) Filed: Jan. 26, 2023

(65) Prior Publication Data

US 2024/0253907 A1 Aug. 1, 2024

(51) Int. Cl.
*B65G 21/08* (2006.01)
*B65G 21/10* (2006.01)

(52) U.S. Cl.
CPC ............. *B65G 21/10* (2013.01); *B65G 21/08* (2013.01)

(58) Field of Classification Search
CPC ................................ B65G 21/08; B65G 21/10
USPC ...................................................... 198/860.5
See application file for complete search history.

(56) References Cited

U.S. PATENT DOCUMENTS

| | | | |
|---|---|---|---|
| 4,236,632 A | 12/1980 | Spodig | |
| 4,573,567 A * | 3/1986 | Swinderman | B65G 21/00 160/354 |
| 4,805,761 A | 2/1989 | Totsch | |
| 4,819,790 A * | 4/1989 | Adcock | B65G 15/60 198/720 |
| 5,161,678 A * | 11/1992 | Garvey | B65G 47/5145 198/860.3 |
| 5,890,583 A | 4/1999 | Garbagnati | |
| 8,047,358 B1 * | 11/2011 | Marcks | B65G 21/08 198/735.5 |
| 8,839,948 B2 | 9/2014 | Landrum et al. | |
| 8,919,543 B2 * | 12/2014 | Jorgensen | B65G 21/08 198/860.3 |
| 9,296,572 B2 * | 3/2016 | Houghton | B65G 69/186 |
| 9,908,710 B2 | 3/2018 | Zambrano et al. | |
| 10,155,624 B1 * | 12/2018 | Nix | B65G 15/08 |
| 10,723,561 B1 * | 7/2020 | Hoover | F16B 21/14 |

* cited by examiner

*Primary Examiner* — Douglas A Hess
(74) *Attorney, Agent, or Firm* — Alston & Bird LLP

(57) ABSTRACT

Apparatuses, systems, methods, and/or the like are provided for a magnetic cover. In some embodiments, a magnetic cover apparatus may include a sheet configured to be attached to a conveyor. The sheet may define one or more flanges configured to align with one or more side rails of the conveyor, wherein the one or more flanges define one or more gaps. The one or more magnetic devices may be operably attached to the one or more flanges, and the one or more magnetic devices are configured to form one or more magnetic connections with the one or more side rails of the conveyor.

13 Claims, 5 Drawing Sheets

MAGNETIC COVER APPARATUSES, SYSTEMS, AND METHODS

TECHNICAL FIELD

The present disclosure relates generally to conveyors. In particular, and in some example embodiments, it relates to magnetic covers for conveyors.

BACKGROUND

In some examples, conveyor covers are used to safeguard the internal components of the conveyor from interference, such as from dust and other contaminants that can disrupt the internal components of the conveyor. Additionally, covers, in some examples, help keep technicians or other individuals who are working around conveyors safe by preventing the technicians or other individuals from placing their hands or limbs inside the conveyor, which could harm the technicians or other individuals and/or damage the conveyor's internal components.

However, technicians or other individuals sometimes do need to repair or work on the internal components of the conveyors. This requires, in some examples, removing or otherwise reorienting the covers, which may be a time and labor intensive process as the screws and other fasteners are unattached to allow the cover to be removed or otherwise reoriented. These screws and other fasteners can also create additional hazards within the work environment. Alternatively or additionally, the screws and other fasteners could be misplaced and lead to further delays.

Through applied effort, ingenuity, and innovation, Applicant has solved problems relating to conveyor covers by developing solutions embodied in the present disclosure, which are described in detail below.

SUMMARY

In general, and in some examples, embodiments of the present disclosure provide covers, magnetic covers, and/or the like.

In accordance with various example embodiments of the present disclosure there is provided a magnetic cover apparatus including a sheet configured to be attached to a conveyor, the sheet defining one or more flanges configured to align with one or more side rails of the conveyor, wherein the one or more flanges define one or more gaps. In some embodiments, the magnetic cover apparatus includes one or more magnetic devices operably attached to the one or more flanges, wherein the one or more magnetic devices are configured to form one or more magnetic connections with the one or more side rails of the conveyor.

In some embodiments, the one or more magnetic devices are operably attached to the one or more flanges by an adhesive.

In some embodiments, the sheet is composed of sheet metal.

In some embodiments, the sheet is composed of galvanized steel.

In some embodiments, the sheet defines a left side and a right side, and the sheet further defines an equal number of the one or more flanges on the left and the right side.

According to various embodiments, there is provided a conveyor system including a conveyor. In some embodiments, the conveyor includes a plurality of rollers configured to support one or more objects; one or more side rails; and one or more internal components. In some embodiments, the conveyor system includes a magnetic cover apparatus operably attached to a top side or a bottom side of the conveyor, wherein the magnetic cover includes: a sheet defining one or more flanges configured to align with the one or more side rails of the conveyor, wherein the one or more flanges define one or more gaps; and one or more magnetic devices operably attached to the one or more flanges, wherein the one or more magnetic devices are configured to form one or more magnetic connections with the one or more side rails of the conveyor.

In some embodiments, the one or more magnetic devices are operably attached to the one or more flanges by an adhesive.

In some embodiments, the adhesive is selected from a group consisting of an epoxy, polyurethane, and a silicone-based adhesive.

In some embodiments, the sheet is composed of sheet metal.

In some embodiments, the sheet is composed of galvanized steel.

In some embodiments, the sheet defines a left side and a right side, and wherein the sheet further defines an equal number of the one or more flanges on the left and the right side.

According to various embodiments, there is provided a method of securing a magnetic cover apparatus to a conveyor, the method including: aligning one or more flanges of a magnetic cover apparatus with one or more side rails of a conveyor, wherein the magnetic cover apparatus includes one or more magnetic devices operably attached to the one or more flanges; and moving the magnetic cover apparatus into proximity of the conveyor such that the one or more magnetic devices form a magnetic connection between the one or more flanges and the one or more side rails of the conveyor.

In some embodiments, the method further includes applying a force to the magnetic cover apparatus such that the magnetic connection is overcome and the magnetic cover apparatus is removed from the conveyor.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various example embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various example embodiments, there is provided a magnetic or otherwise detachable cover apparatus that may be integrated into a conveyor to provide protection to one or more internal components of the conveyor. In some examples, the magnetic cover apparatus may be a substantially planar piece of sheet metal. In some embodiments the substantially planar piece of sheet metal may define one or more flanges that further define one or more gaps. In some embodiments, the gaps may be holes or punches disposed through the one or more flanges. The one or more flanges may be defined on the left and right sides of the magnetic cover apparatus and may include one or more magnetic devices disposed within the gaps, which may be substantially the same shape as the magnetic devices for, in some examples, a snug and secure fit. The magnetic devices may be additionally or alternatively secured within the gaps by, for example, an adhesive or other bonding solution. The one or more magnetic devices may be used to form one or more magnetic connections between the flanges and one or more side rails of the conveyor. In at least this way, the magnetic cover apparatus may be magnetically secured to the conveyor and thereby safeguard the one or more internal components of the conveyor.

Example Magnetic Cover Apparatus

Figure 1A:
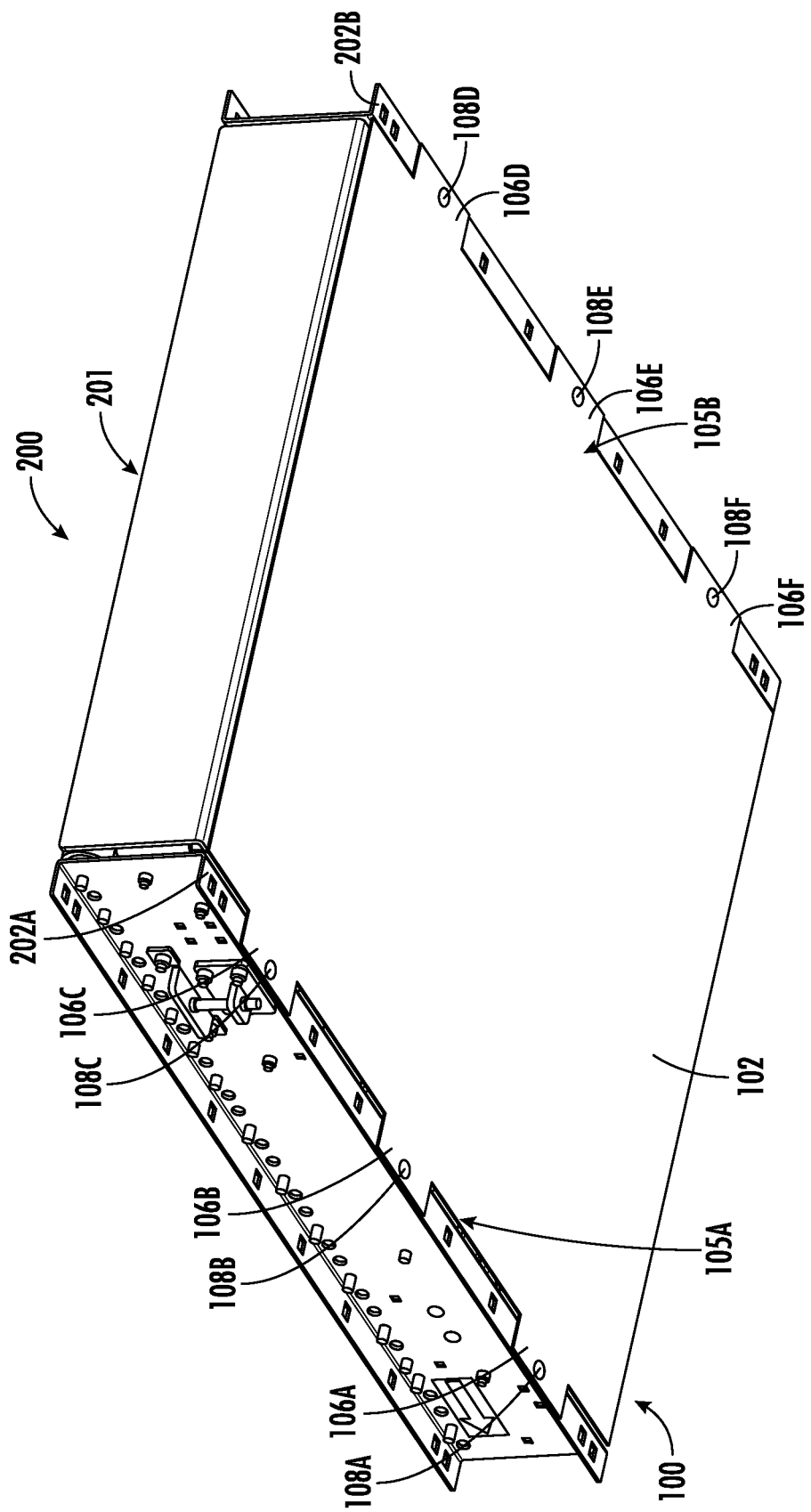
FIG. 1A is a bottom perspective view of an example magnetic cover apparatus in accordance with various embodiments of the present disclosure.
Figure 1B:
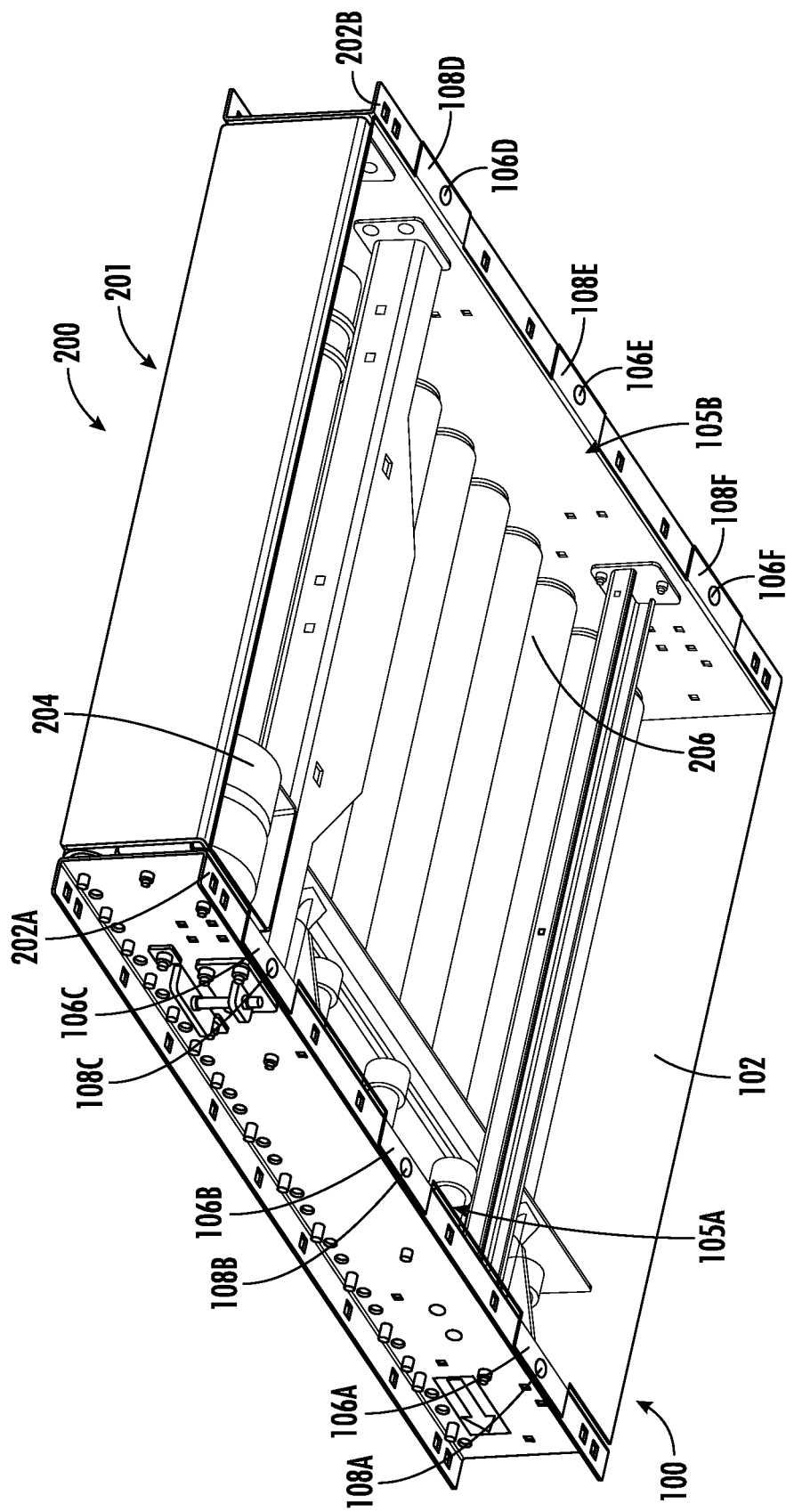
FIG. 1B is a bottom perspective of an example conveyor in accordance with various embodiments of the present disclosure.
Figure 2:
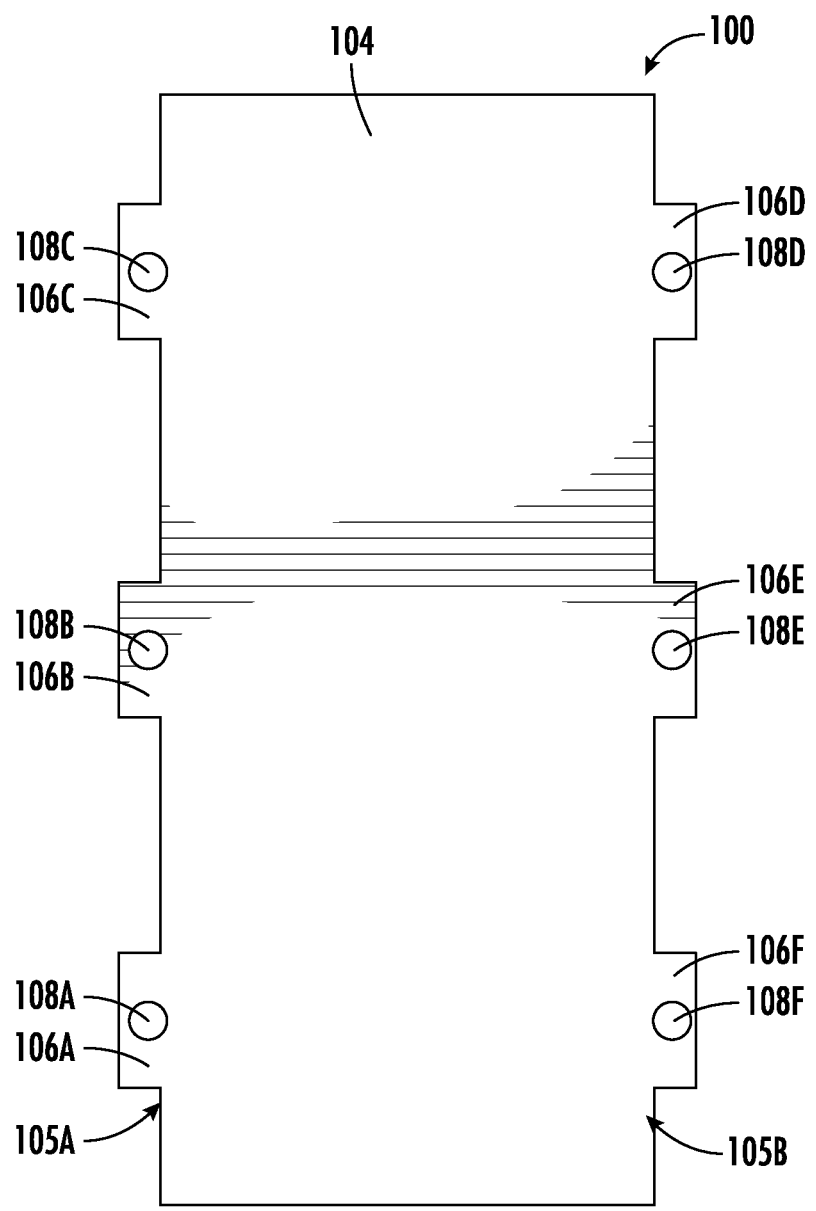
FIG. 2 is a top plan view of an example magnetic cover apparatus in accordance with various embodiments of the present disclosure.

FIGS. 1A and 1B show a bottom perspective view of an example magnetic cover apparatus 100, and FIG. 2 shows a top plan view of the example magnetic cover apparatus 100. The example magnetic cover apparatus 100 is shown as translucent in FIG. 1B to highlight the internal features of an example conveyor system 200. In some embodiments, the magnetic cover apparatus 100 may have a bottom side 102 and a top side 104 (as shown in at least FIGS. 2 and 3). In some embodiments, the magnetic cover apparatus 100 is a substantially planar, thin sheet composed of sheet metal, which may be composed of steel, aluminum, or any other suitable metal. In some embodiments, the magnetic cover apparatus 100 may be substantially rectangular in shape, but in other embodiments the magnetic cover apparatus 100 may take on a variety of different shapes as desired. In some embodiments, when the magnetic cover apparatus 100 is substantially rectangular, the magnetic cover apparatus 100 may have a width ranging between 10 and 70 inches and a width ranging between 20 and 60 inches. In some embodiments, the magnetic cover apparatus 100 may have a square footage ranging between 4 square feet and 16 square feet.

In some embodiments, the magnetic cover apparatus 100 may define a left side 105A and a right side 105B. In some embodiments, the left side 105A and the right side 105B may each define one or more flanges 106A-106F. In some embodiments, an equal number of flanges 106A-F may be disposed on the left and right sides 105A, 105B. In some embodiments, the flanges 106A-F may be cut outs from the apparatus 100, and in other embodiments the flanges 106A-F may be formed when the apparatus 100 is first machined. Three flanges 106A-F are shown on each side in at least FIGS. 1A and 1B, but it will be understood that greater or fewer flanges 106A-F may be disposed on the left and right sides 105A, 105B, and that unequal numbers of flanges 106A-F may be disposed on the left and right sides 105A, 105B (e.g., two flanges 106A, 106B on the left side 105A and four flanges 106C-F on the right side 105B). In some embodiments, when the magnetic cover apparatus 100 is substantially rectangular, the one or more flanges 106A-F may have a length ranging between 3 inches and 10 inches and a width ranging between 2 inches and 5 inches. In some embodiments, there may be between 3 and 9 inches between each flange 106A-F on the respective left or right sides 105A, 105B.

Figure 3:
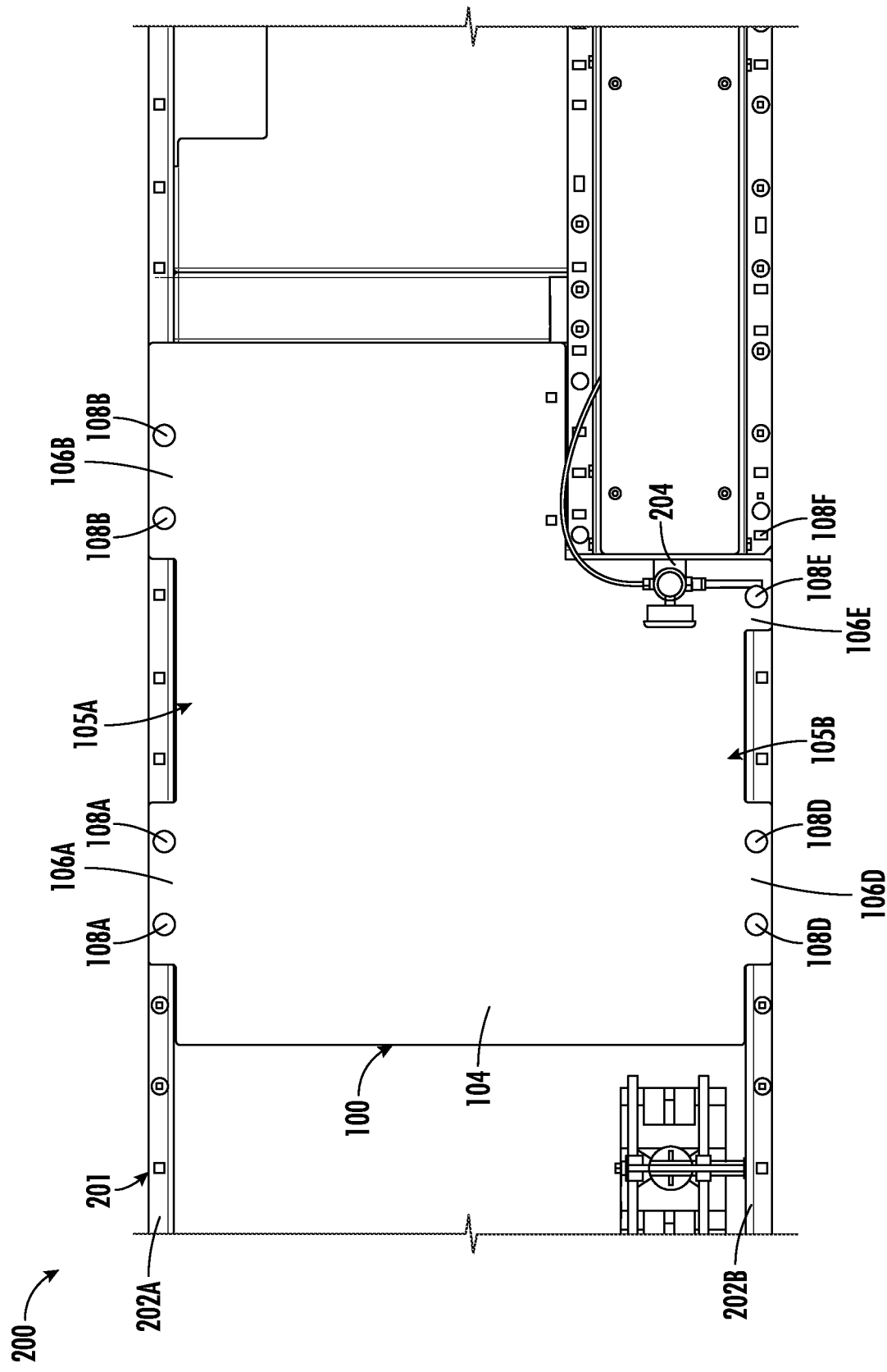
FIG. 3 is a top plan view of an example magnetic cover apparatus in accordance with various embodiments of the present disclosure.

In some embodiments, the flanges 106A-F may include one or more gaps in which one or more magnetic devices 108A-F may be disposed. In some embodiments, the gaps may be holes or punches disposed through the flanges 106A-F. In some embodiments, the gaps may be substantially circular and have a diameter ranging between 0.4 and 0.5 inches. In some embodiments, the magnetic devices 108A-F may be substantially disc-shaped magnets made from a metal alloy and may have a diameter of 0.3 inches. In some embodiments, the metal alloy may be composed of one or more of iron, nickel, aluminum, or cobalt. In some embodiments, the magnetic devices may have a thickness ranging between 0.01 and 0.1 inches. In some embodiments, the magnetic devices may have a thickness of 0.05 inches. In some embodiments, the gaps may have a diameter that is 0.005 inches less than the diameter of the magnetic devices 108A-F, and this may enable a snug fit between the magnetic devices 108A-F and the one or more gaps of the flanges 106A-F. In some embodiments, the one or more magnetic devices 108A-F may be secured in the gaps of the flanges 106A-F by an adhesive, such as an epoxy, polyurethane, a silicone-based adhesive, or any other adhesive suitable for bonding with the material composing the flanges 106A-F of the magnetic cover apparatus 100, which may be galvanized metal. In some embodiments, one magnetic device 108A may be disposed in one gap per one flange 106A, as shown in FIGS. 1A, 1B, and 2. In other embodiments, more than one magnetic device 108A may be disposed in multiple gaps per one flange 106A, as shown in FIG. 3. In other embodiments, multiple magnetic devices 108A-F may be disposed per each individual flange 106A-F. For example, five magnetic devices 108A-E could be disposed within a single flange (e.g., 106A).

Figure 4:
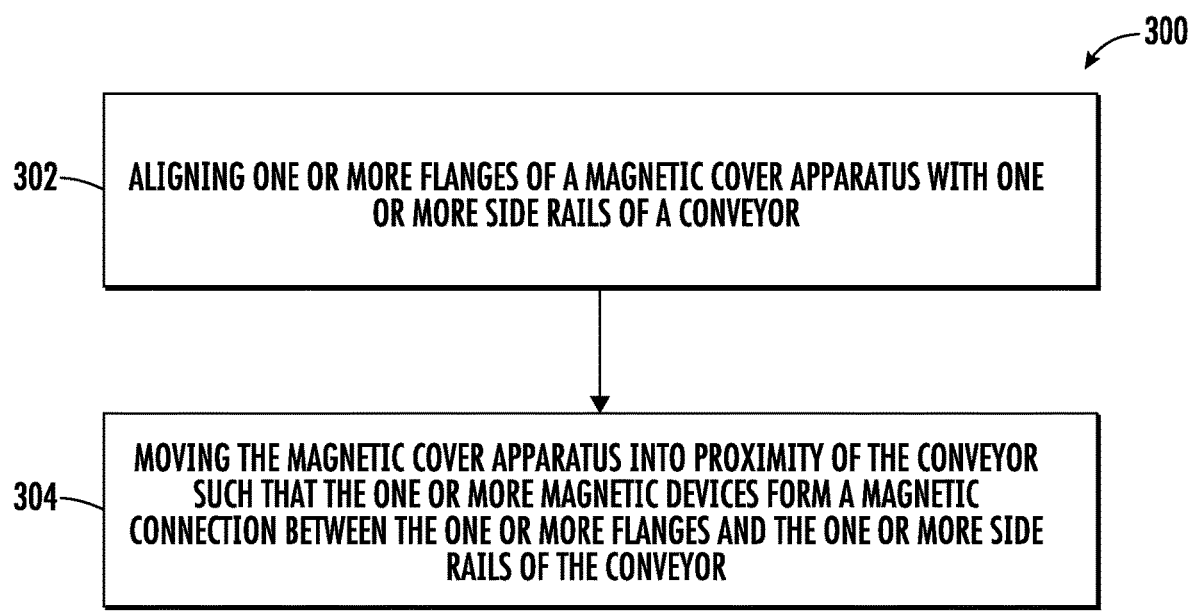
FIG. 4 is an example flow chart of an example method of use for an example magnetic cover apparatus in accordance with various embodiments of the present disclosure.

In some embodiments, and as shown in at least FIGS. 1A, 1B, and 4, an example magnetic cover apparatus 100 may be secured to a conveyor system 200 having a conveyor 201 with side rails 202A, 202B. In some embodiments, the one or more flanges 106A-F may be aligned with the side rails 202A, 202B of the conveyor system 200. For example, and as shown in FIGS. 1A, 1B, and 3, the flanges on the left side 106A-C of the apparatus 105A may be configured to align with a first side rail 202A while the flanges on the right side 106D-F of the apparatus 105B may be configured to align with a second side rail 202B. In other embodiments, the orientations may be reversed.

In some embodiments, the side rails 202A, 202B may be composed of metal or any other material that may be magnetically attractive. In other embodiments, the side rails 202A, 202B may themselves be magnets or magnetized. In some embodiments, the bottom side 102 of the apparatus 100 may be placed on the conveyor 201, while in other embodiments the orientation may be reversed, with the top side 105 placed on the conveyor 201.

In some embodiments, once the one or more flanges 106A-F are aligned with the side rails 202A, 202B in such a way that the one or more magnetic devices 108A-F secured within the flanges 106A-F may be brought into proximity with the one or more side rails 202A, 202B such that the one or more magnetic devices 108A-F form one or more magnetic connections with the side rails 202A, 202B. In at least this way, the magnetic cover apparatus 100 may be secured to the side rails 202A, 202B and, by extension, secured to the conveyor system 200. In some embodiments, once the magnetic cover apparatus 100 is secured to the conveyor system 200, the magnetic cover apparatus 100 may be a substantially smooth, planar surface on the bottom of the conveyor system without protrusions or holes, which have been filled in by the one or more magnetic devices 108A-F. In at least this way, the magnetic cover apparatus 100 may in some examples, be visually clean and uncluttered without visible assembly or attachment hardware.

In some embodiments, the conveyor system 200 may have one or more internal components 204 and one or more rollers 206. In some embodiments, the magnetic cover apparatus 100 may be configured to secure or otherwise protect the one or more internal components against outside interference and/or contaminants. For example, the magnetic cover apparatus 100 may prevent dust and other contaminants from entering the system 200. As another example, the magnetic cover apparatus 100 may prevent a technician or other individual from placing (accidentally or intentionally) his or her hand or other body part, tool, or the like into the conveyor system during operation. In some embodiments, the one or more rollers 206 may be configured to support one or more objects being transported by the conveyor system 200, and the magnetic cover apparatus 100 may similarly protect the underside of the rollers 206 from interference as the internal component 204 may be protected.

In some embodiments, the magnetic cover apparatus 100 may be removed from the conveyor system 200 when the one or more internal components 204 and/or the one or more rollers 206 need to be accessed by a technician. For example, the one or more internal components 204 may need to be replaced. A technician may simply remove the magnetic cover apparatus 100 by applying sufficient force to overcome the magnetic connections between the one or more magnetic devices 108A-F and the side rails 202A-B. The one or more internal components 204 and/or the one or more rollers 206 may then be accessed, repaired and/or replaced as necessary, and the magnetic cover apparatus 100 may be reattached as described above.

Example Methods of Use/Manufacture/Etc

FIG. 4 is an example flow chart of an example method 300 of securing a magnetic cover apparatus to a conveyor according to various embodiments. Although the method 300 is described with reference to apparatus 100 and system 200 and their various components as previously described the method 300 may be implemented on any number of suitable apparatuses and systems.

In some embodiments, the method 300 may include a step 302 of aligning one or more flanges of a magnetic cover apparatus with one or more side rails of a conveyor, wherein the magnetic cover apparatus includes one or more magnetic devices operably attached to the one or more flanges. In some embodiments, the method 300 may include a step 304 of moving the magnetic cover apparatus into proximity of the conveyor such that the one or more magnetic devices form a magnetic connection by way of an electromagnetic force between the one or more flanges and the one or more side rails of the conveyor. In some embodiments, the method 300 may include an additional step of applying a force to the magnetic cover apparatus such that the magnetic connection is overcome and the magnetic cover apparatus is removed from the conveyor.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A magnetic cover apparatus comprising:
 a sheet operably attached to a top side or a bottom side of a conveyor, the sheet defining one or more flanges configured to align with one or more side rails of the conveyor, wherein the one or more flanges define one or more gaps; and
 one or more magnetic devices operably attached to the one or more flanges, wherein the one or more magnetic devices are configured to form one or more magnetic connections with the one or more side rails of the conveyor.

2. The magnetic cover apparatus of claim 1, wherein the one or more magnetic devices are operably attached to the one or more flanges by an adhesive.

3. The magnetic cover apparatus of claim 2, wherein the adhesive is selected from a group consisting of an epoxy, polyurethane, and a silicone-based adhesive.

4. The magnetic cover apparatus of claim 1, wherein the sheet comprises sheet metal.

5. The magnetic cover apparatus of claim 1, wherein the sheet comprises galvanized steel.

6. The magnetic cover apparatus of claim 1, wherein the sheet defines a left side and a right side, and wherein the sheet further defines an equal number of the one or more flanges on the left and the right side.

7. A conveyor system comprising:
 a conveyor comprising:

a plurality of rollers configured to support one or more objects;
one or more side rails; and
one or more internal components;
a magnetic cover apparatus operably attached to a top side or a bottom side of the conveyor, wherein the magnetic cover comprises:
a sheet defining one or more flanges configured to align with the one or more side rails of the conveyor, wherein the one or more flanges define one or more gaps; and
one or more magnetic devices operably attached to the one or more flanges, wherein the one or more magnetic devices are configured to form one or more magnetic connections with the one or more side rails of the conveyor.

8. The conveyor system of claim 7, wherein the one or more magnetic devices are operably attached to the one or more flanges by an adhesive.

9. The conveyor system of claim 7, wherein the sheet comprises sheet metal.

10. The conveyor system of claim 7, wherein the sheet comprises galvanized steel.

11. The conveyor system of claim 7, wherein the sheet defines a left side and a right side, and wherein the sheet further defines an equal number of the one or more flanges on the left and the right side.

12. A method of securing a magnetic cover apparatus to a conveyor, the method comprising:
aligning one or more flanges of a magnetic cover apparatus with one or more side rails of a conveyor, wherein the magnetic cover apparatus comprises one or more magnetic devices operably attached to the one or more flanges; and
moving the magnetic cover apparatus into proximity of the conveyor such that the one or more magnetic devices form a magnetic connection between the one or more flanges and the one or more side rails of the conveyor.

13. The method of claim 12, further comprising:
applying a force to the magnetic cover apparatus such that the magnetic connection is overcome and the magnetic cover apparatus is removed from the conveyor.

* * * * *